United States Patent
Zhou (10) Patent No.: US 11,405,537 B2
(45) Date of Patent: Aug. 2, 2022

(54) CAMERA ASSEMBLY AND ELECTRONIC DEVICE HAVING THE SAME

(71) Applicant: GUANGDONG OPPO MOBILE TELECOMMUNICATIONS CORP., LTD., Guangdong (CN)

(72) Inventor: Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 102 days.

(21) Appl. No.: 16/770,334

(22) PCT Filed: Nov. 30, 2018

(86) PCT No.: PCT/CN2018/118554
§ 371 (c)(1),
(2) Date: Jun. 5, 2020

(87) PCT Pub. No.: WO2019/114570
PCT Pub. Date: Jun. 20, 2019

(65) Prior Publication Data
US 2020/0358932 A1    Nov. 12, 2020

(30) Foreign Application Priority Data
Dec. 13, 2017  (CN) .......................... 201711332544.8

(51) Int. Cl.
*H04N 5/225* (2006.01)
*G02B 1/04* (2006.01)
(Continued)

(52) U.S. Cl.
CPC ............. *H04N 5/2254* (2013.01); *G02B 1/04* (2013.01); *G02B 5/04* (2013.01); *G02B 7/1805* (2013.01);
(Continued)

(58) Field of Classification Search
CPC .. H04N 5/2254; H04N 5/2253; H04N 5/2256; H04N 5/2257; H04N 5/2251;
(Continued)

(56) References Cited

U.S. PATENT DOCUMENTS 11,138,301 B1 *  10/2021  Castaneda ............ G02B 27/017
2016/0341848 A1 *  11/2016  Nakamura ......... G06K 9/00791
(Continued)

FOREIGN PATENT DOCUMENTS

CN  101650774 A  2/2010
CN  103530617 A  1/2014
(Continued)

OTHER PUBLICATIONS

EP Search Report for EP application 18888767.3 dated Jan. 18, 2021.
(Continued)

*Primary Examiner* — Nasim N Nirjhar
(74) *Attorney, Agent, or Firm* — Young Basile Hanlon & MacFarlane, P.C.

(57) ABSTRACT

A camera assembly and an electronic device having the same are provided. The camera assembly includes a main board, a cover plate, a camera, an infrared lamp and a deflection member. The mainboard and the cover plate are arranged parallel to and spaced apart from each other. The camera and the infrared lamp are arranged on a side of the main board facing towards the cover plate, and spaced apart from each other. The deflection member is arranged on a side of the cover plate facing towards the main board, and is opposite to the camera. The deflection member is configured to deflect infrared light emitted by the infrared lamp towards a direction of a central axis of the camera.

14 Claims, 5 Drawing Sheets

(51) Int. Cl.
*G02B 5/04* (2006.01)
*G02B 7/18* (2021.01)
*H04M 1/02* (2006.01)
*G06V 40/19* (2022.01)

(52) U.S. Cl.
CPC ........ *H04M 1/0264* (2013.01); *H04N 5/2253* (2013.01); *H04N 5/2256* (2013.01); *H04N 5/2257* (2013.01); *G06V 40/19* (2022.01)

(58) Field of Classification Search
CPC .......... G02B 1/04; G02B 5/04; G02B 7/1805; H04M 1/0264; G06K 9/00604; G06K 9/209
See application file for complete search history.

(56) References Cited

U.S. PATENT DOCUMENTS

2017/0033442 A1* 2/2017 Choi ........................ H01Q 1/24
2018/0235489 A1* 8/2018 Mouradian ........ A61B 5/02416

FOREIGN PATENT DOCUMENTS

| | | |
|---|---|---|
| CN | 104573676 A | 4/2015 |
| CN | 105917357 A | 8/2016 |
| CN | 106548115 A | 3/2017 |
| CN | 206209868 U | 5/2017 |
| CN | 107451542 A | 12/2017 |
| CN | 107864323 A | 3/2018 |
| CN | 108171125 A | 6/2018 |
| KR | 20140098364 A | 8/2014 |

OTHER PUBLICATIONS

English translation of China OA for CN application 201711332544.8 dated Apr. 16, 2019.
English translation of China OA for CN application 201711332544.8 dated Sep. 3, 2019.
English translation of International Search Report for PCT/CN2018/118554 dated Mar. 2, 2019.
Indian Examination Report for IN Application 202017025820 dated Aug. 12, 2021. (7 pages).

* cited by examiner

CAMERA ASSEMBLY AND ELECTRONIC DEVICE HAVING THE SAME

CROSS-REFERENCE TO RELATED APPLICATION(S)

The present application is a 371 application of International Patent Application No. PCT/CN2018/118554, filed on Nov. 30, 2018, which claims prior to Chinese Application No. 201711332544.8, filed on Dec. 13, 2017, the entire disclosures of both of which are hereby incorporated by reference in their entireties.

TECHNICAL FIELD

The present disclosure relates to a technical field of electronic devices, and more particularly to a camera assembly and an electronic device having the same.

BACKGROUND

The iris identification technology is more and more widely used. For example, an electronic device such as a mobile phone has a function of iris identification which can realize the iris unlocking. During the iris unlocking, human eyes need to face towards the iris lock, and an infrared light emitted from an infrared lamp also enters the human eyes. Since there is a certain distance between the infrared lamp and the camera, the infrared light from the infrared lamp actually deviates from the human eyes, such that the infrared light received by the human eyes is relatively weak, thus tending to cause the unlocking failure due to the insufficient infrared light captured by the camera.

SUMMARY

A camera assembly for an electronic device according to a first aspect of embodiments of the present disclosure includes: a cover plate; a main board arranged parallel to the cover plate and spaced apart from the cover plate; a camera arranged on a side of the main board facing towards the cover plate; an infrared lamp arranged on the side of the main board facing towards the cover plate, the infrared lamp being spaced apart from the camera; and a deflection member arranged on a side of the cover plate facing towards the main board and being opposite to the camera. The deflection member is configured to deflect infrared light emitted from the infrared lamp towards a direction of a central axis of the camera.

An electronic device according to a second aspect of embodiments of the present disclosure includes: a housing; a cover plate connected to the housing to define an inner space therebetween; a main board received in the inner space, arranged parallel to and spaced apart from the cover plate; a camera arranged on a side of the main board facing towards the cover plate; an infrared lamp arranged on the side of the main board facing towards the cover plate, the infrared lamp being spaced apart from the camera; and a deflection member arranged on a side of the cover plate facing towards the main board and being opposite to the camera. The deflection member is configured to deflect infrared light emitted from the infrared lamp towards a direction of a central axis of the camera.

A camera assembly for an electronic device according to a third aspect of embodiments of the present disclosure includes: a cover plate; a main board arranged parallel to the cover plate and spaced apart from the cover plate; a camera arranged to the main board and facing towards the cover plate; an infrared lamp arranged to the main board, facing towards the cover plate, and spaced apart from the camera; and a deflection member arranged to the cover plate, facing towards the main board and being opposite to the camera. The deflection member is configured to deflect infrared light emitted from the infrared lamp in such a manner that the infrared light emitted from the infrared lamp is propagated in a direction of a central axis of the camera after passing through the deflection member.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and/or additional aspects and advantages of the present disclosure will become apparent and readily appreciated from the following descriptions of embodiments made with reference to the drawings.

DETAILED DESCRIPTION

Embodiments of the present disclosure are further described. Examples of the embodiments are illustrated in the accompanying drawings. The same or similar elements and the elements having same or similar functions are denoted by like reference numerals throughout the descriptions. The embodiments described below with reference to the accompanying drawings are examples, are intended to be used to explain the present disclosure, and cannot be construed as limitation to the present disclosure.

In the specification of the present disclosure, it is to be understood that, terms such as "central," "longitudinal," "lateral," "length," "width," "thickness," "upper," "lower," "front," "rear," "left," "right," "vertical," "horizontal," "top," "bottom," "inner," "outer," "clockwise", "counter clockwise", "axial," "radial", and "circumferential" indicate the orientation or position relationship based on the orientation or position relationship illustrated in the drawings only for convenience of description or for simplifying description of the present disclosure, and do not alone indicate or imply that the device or element referred to must have a particular orientation or be constructed and operated in a specific orientation, and hence cannot be construed as limitation to the present disclosure. In addition, the feature defined with "first" and "second" may comprise one or more of this feature. In the description of the present disclosure, the term "a plurality of" means at least two, such as two, three and so on, unless specified otherwise.

In the present disclosure, it should be noted that, unless specified otherwise, terms "mounted," "coupled," and "connected," are used broadly, for example, may be fixed connections, detachable connections, or integral connections; may also be mechanical or electrical connections; may also be direct connections or indirect connections via intervening structures; may also be inner communications of two elements, which may be understood by those skilled in the related art according to specific situations.

A camera assembly for an electronic device according to embodiments of the present disclosure will be described below with reference to FIGS. 2-5.

As illustrated in FIGS. 2-5, the camera assembly for the electronic device according to a first aspect of embodiments of the present disclosure includes a main board 1, a cover plate 2, a camera 4, an infrared lamp 5 and a deflection member 6.

Specifically, the main board 1 and the cover plate 2 are arranged parallel to and spaced apart from each other. The cover plate 2 may be a flat touch-screen cover plate, and the cover plate 2 may be made of glass materials. The camera 4 and the infrared lamp 5 are arranged on a side of the main board 1 facing towards the cover plate 2. The camera 4 is spaced apart from the infrared lamp 5 by a certain distance (referring to a distance L in FIGS. 3-5). The camera 4 is an iris camera. It should be noted that the infrared lamp 5 of the present disclosure is an ordinary infrared lamp which does not need to be specially customized and has no deflection function, so that the infrared lamp 5 of the present disclosure has a short manufacturing cycle and a low manufacturing cost.

The deflection member 6 is configured to deflect infrared light emitted from the infrared lamp 5 towards a direction of a central axis of the camera 4. That is, the infrared light emitted from the infrared lamp 5 is propagated in the direction of the central axis of the camera 4 after passing through the deflection member 6. The deflection member 6 is arranged on a side of the cover plate 2 facing towards the main board 1 and is opposite to the camera 4. Thus, when the camera assembly is applied to the electronic device 1000 such as a mobile phone, the mobile phone needs to be unlocked by an iris. In this case, human eyes 2000 may face the infrared lamp 5, the infrared light emitted from the infrared lamp 5 directly irradiates the human eye 2000, and the infrared light irradiating the human eyes is reflected to the deflection member 6. After being deflected with a certain angle by the deflection member 6, the infrared light is captured by the camera 4. By providing the deflection member 6, the infrared light emitted from the infrared lamp 5 can vertically irradiate the camera 4, such that the camera 4 can capture much infrared light to realize the unlocking.

The deflection member 6 in the present disclosure may be designed to have different deflection angles according to requirements, so as to realize any deflection angle of the infrared light emitted from the infrared lamp 5, thus greatly improving the stacking of the entire mobile phone. During the stacking, the deflection angle of the infrared light may be ignored, and the distance L between the infrared lamp 5 and the camera 4 may be arbitrarily changed. In addition, since the infrared lamp 5 does not need to be specially customized, the cost of customizing the infrared lamp 5 can be saved and the universality of the infrared lamp 5 can also be realized.

The camera assembly in the present disclosure can realize any deflection angle by adding the deflection member 6 at a front side of the camera 4. When positions of the camera 4 and the infrared lamp 5 in the electronic device 1000 (such as the mobile phone) change, only the deflection member 6 needs to be remade. Thus, the processing cycle is short and the cost is low, hence causing little impact on the progress of the whole project.

In the camera assembly for the electronic device according to the embodiments of the present disclosure, by adding the deflection member 6 at the front side of the camera 4, the infrared light emitted from the infrared lamp 5 is reflected by the iris to form the reflected light, and then the reflected light is deflected by the deflection member 6 and vertically irradiates the camera 5, such that the camera 4 can capture much infrared light to realize the unlocking and prevent the unlocking from being failed. Moreover, the deflection member 6 having different deflection angles may be provided according to requirements of the deflection angle. Since the infrared lamp 5 does not need to be specially customized, the cost can be reduced and the universality of the infrared lamp 5 can also be realized.

In some embodiments of the present disclosure, in a direction from the camera 4 to the infrared lamp 5 (referring to a direction e1 in FIGS. 3-5), a size of the deflection member 6 is larger than a size of the camera 4. Thus, it is ensured that the infrared light emitted from the infrared lamp 5 vertically irradiates the camera 4 after being deflected by the deflection member 6, such that the camera 4 can capture much infrared light.

In some embodiments, the deflection member 6 may be connected to the cover plate 2 by an adhesive layer 3. Thus, it is convenient to fix and mount the deflection member 6. For example, the deflection member 6 may be fixed on the cover plate 2 by a double-sided adhesive, a dispensed adhesive or the like.

In some embodiments, the deflection member 6 may be a polymethyl methacrylate (PMMA) member, a polycarbonate (PC) member, etc. Thus, the cost can be reduced and the processing cycle can be further shortened. Generally, the processing and molding cycle only needs about one week, thus causing little impact on the progress of the whole project.

In some embodiments of the present disclosure, in a direction from the camera 4 to the cover plate 2 (referring to a direction e2 in FIGS. 3-5), the deflection member 6 has a first surface 61 and a second surface 62 opposite to each other. The first surface 61 is adjacent to the camera 4, while the second surface 62 is far away from the camera 4, and the first surface 61 and the second surface 62 define an angle therebetween. In this case, the deflection member 6 may be a triangular prism, such that the infrared light emitted from the infrared lamp 5 directly irradiates the human eyes 2000, and then is reflected to the deflection member 6. The light is deflected as required when passing through the deflection member 6, and the deflection member 6 has a simple structure and is easy to be manufactured. In some embodiments, a section of the deflection member 6 (the section of the deflection member 6 refers to a plane figure taken from the deflection member 6 along a plane where an optical axis of the infrared lamp 5 and the optical axis of the camera 4 are) may have a triangle shape, a trapezoid shape, etc.

According to some embodiments of the present disclosure, a wavelength of the infrared light emitted from the infrared lamp 5 is 940 nm. A tolerance range of the wavelength may be ±20 nm. The infrared light of 940 nm provides an effective light source for the iris imaging while is not visible to the human eyes 2000, so that the user experience is great. Moreover, the infrared light of 940 nm has a good identification effect for the black iris, and hence the infrared lamp 5 may be used for specific Asian people, therefore improving the use comfort and the identification efficiency.

A camera assembly according to a plurality of embodiments of the present disclosure will be described below with reference to FIGS. 2-5.

First Embodiment

Figure 2:
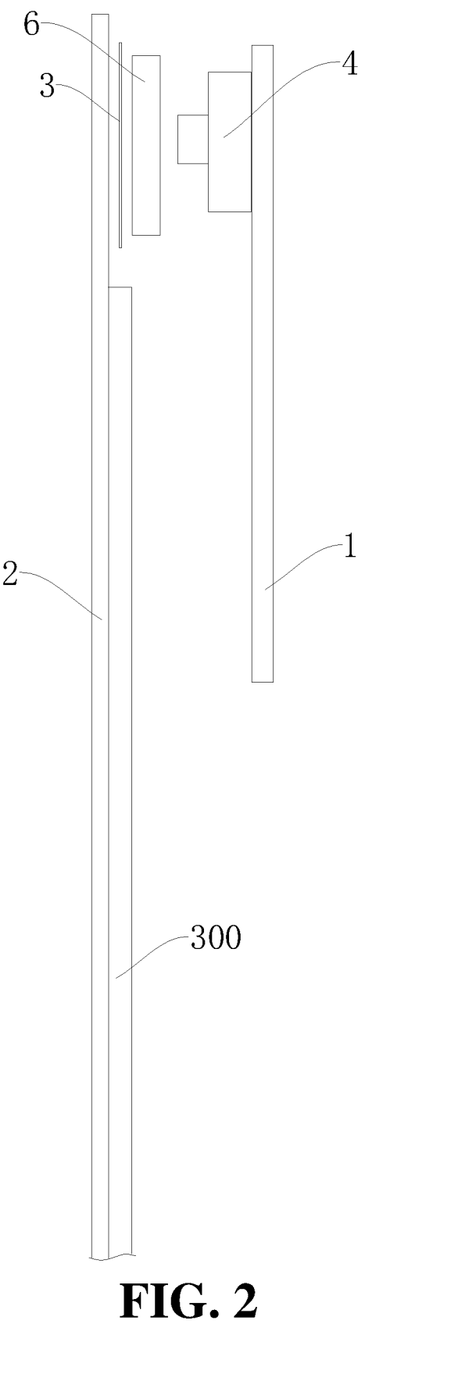
FIG. 2 is a schematic view of a camera assembly according to an embodiment of the present disclosure.
Figure 3:
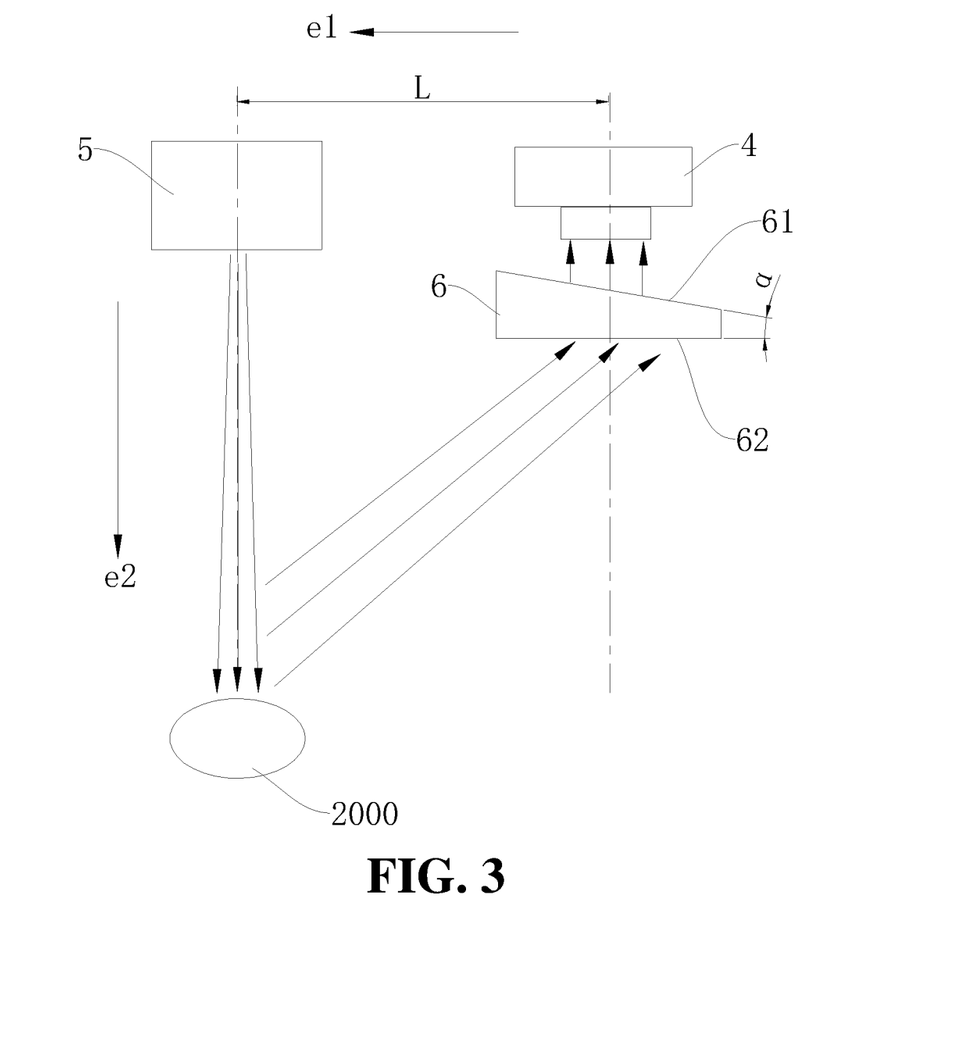
FIG. 3 is a schematic view illustrating a working principle of a camera assembly according to a first embodiment of the present disclosure.

As illustrated in FIG. 2 and FIG. 3, in this embodiment, the camera assembly includes the main board 1, the cover plate 2, the camera 4, the infrared lamp 5 and the deflection member 6, as described above. In a direction from the camera 4 to the infrared lamp 5, the first surface 61 is inclined towards the camera 4. The deflection angle of the deflection member 6 may be adjusted by changing an inclination angle α of the first surface 61 with respect to the direction e1. The second surface is parallel to the cover plate 2. In this case, a thickness (the thickness refers to a size of the deflection member 6 in a direction from the camera 4 to the cover plate 2) of the deflection member 6 may increase in the direction from the camera 4 to the infrared lamp 5. The human eyes 2000 face the infrared lamp 5, and the infrared light emitted from the infrared lamp 5 directly irradiates the human eyes 2000 and then is reflected to the deflection member 6. When being deflected by the deflection member 6, the light is deflected in a direction towards a larger thickness of the deflection member 6, i.e. a portion of the deflection member 6 having a larger thickness than other portions thereof, such that the infrared light vertically irradiates the camera 4. Thus, the camera 4 can capture much infrared light and realize the unlocking.

In some embodiments, the above first surface 61 may be a planar structure, and hence is easy to be processed and molded.

In some embodiments, the above first surface 61 may also be a curved surface structure. In the direction from the camera 4 to the infrared lamp 5, a tangent line of each point on the first surface 61 is inclined towards the camera 4. Therefore, it is ensured that the infrared light irradiates the camera 4 vertically.

In addition, since the second surface 62 of the deflection member 6 is parallel to the cover plate 2, it is convenient for the deflection member 6 to be mounted and fixed on the cover plate 2.

Second Embodiment

Figure 4:
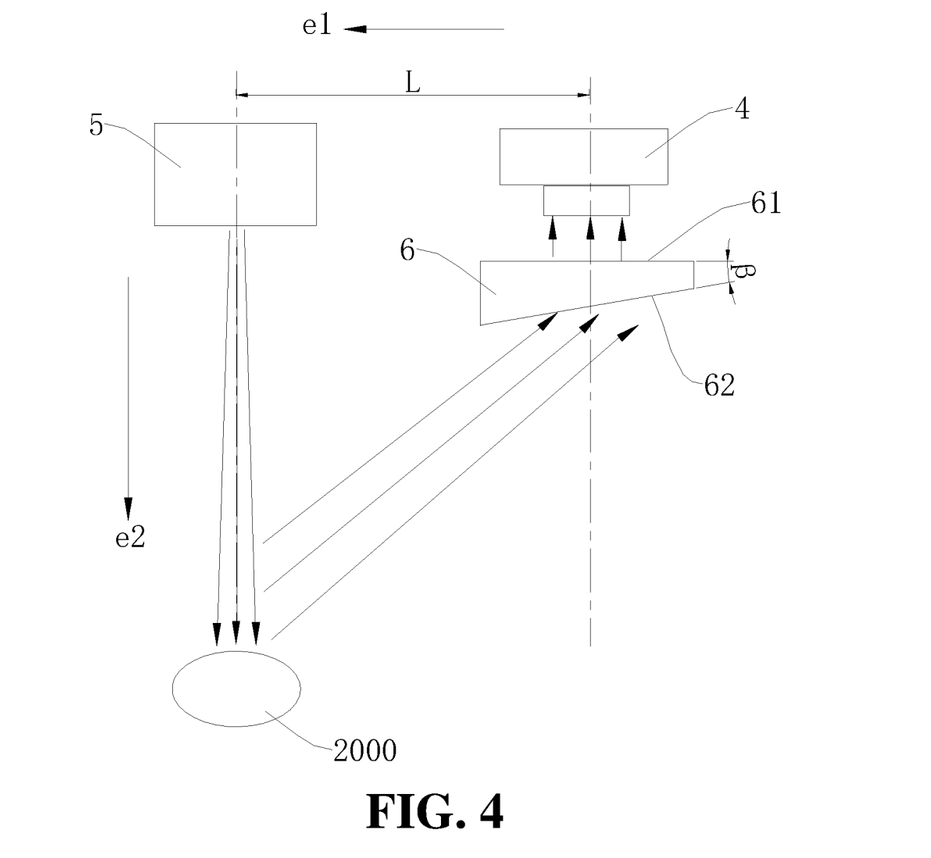
FIG. 4 is a schematic view of a working principle of a camera assembly according to a second embodiment of the present disclosure.

As illustrated in FIG. 2 and FIG. 4, in this embodiment, the camera assembly includes the main board 1, the cover plate 2, the camera 4, the infrared lamp 5 and the deflection member 6, as described above. The first surface 61 is parallel to the cover plate 2. In the direction from the camera 4 to the infrared lamp 5, the second surface 62 is inclined towards the cover plate 2, and the deflection angle of the deflection member 6 may be adjusted by changing an inclination angle β of the second surface 62 with respect to the direction e1. In this case, a thickness (the thickness refers to a size of the deflection member 6 in a direction from the camera 4 to the cover plate 2) of the deflection member 6 may increase in the direction from the camera 4 to the infrared lamp 5. The human eyes 2000 face the infrared lamp 5, and the infrared light emitted from the infrared lamp 5 directly irradiates the human eyes 2000 and then is reflected to the deflection member 6. When being deflected by the deflection member 6, the light is deflected in a direction towards a larger thickness of the deflection member 6, i.e. a portion of the deflection member 6 having a larger thickness than other portions thereof, such that the infrared light vertically irradiates the camera 4. Thus, the camera 4 can capture much infrared light and realize the unlocking.

Third Embodiment

Figure 5:
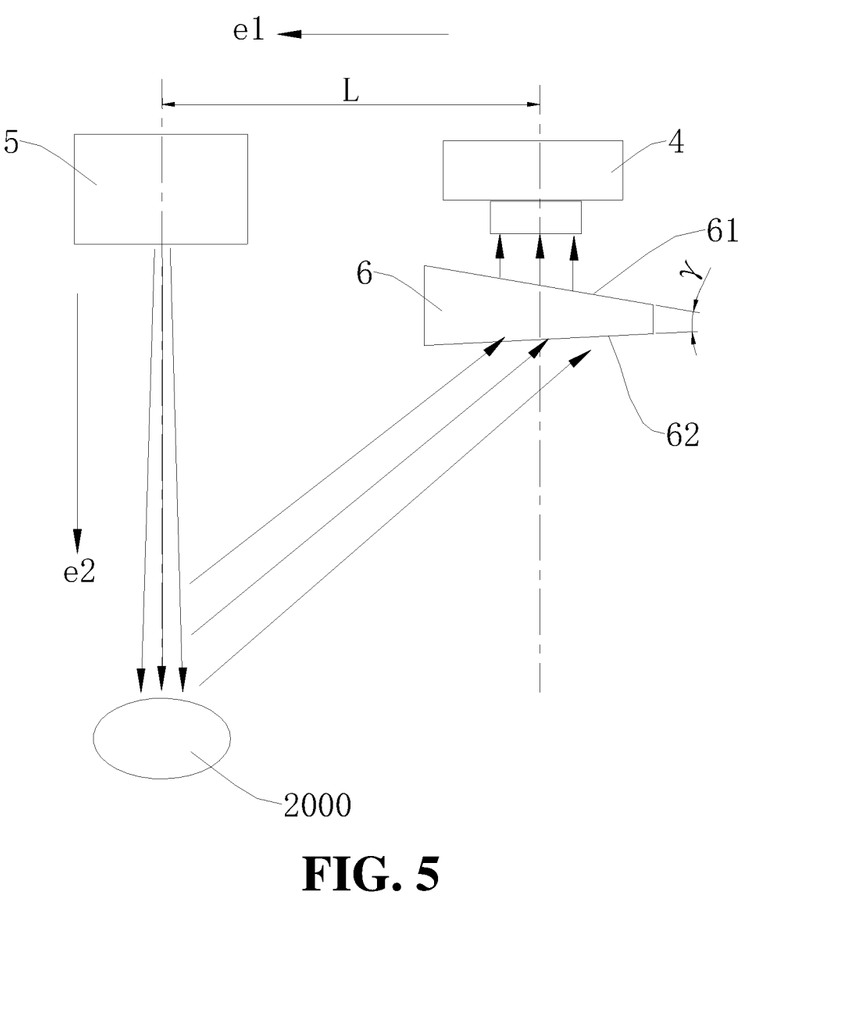
FIG. 5 is a schematic view of a working principle of a camera assembly according to a third embodiment of the present disclosure.

As illustrated in FIG. 2 and FIG. 5, in this embodiment, the camera assembly includes the main board 1, the cover plate 2, the camera 4, the infrared lamp 5 and the deflection member 6, as described above. In a direction from the camera 4 to the infrared lamp 5, the first surface 61 is inclined towards the camera 4. In the direction from the camera 4 to the infrared lamp 5, the second surface 62 is inclined towards the cover plate 2. The deflection angle of the deflection member 6 may be adjusted by changing an included angle γ between the first surface 61 and the second surface 62. In this case, a thickness (the thickness refers to a size of the deflection member 6 in a direction from the camera 4 to the cover plate 2) of the deflection member 6 may increase in the direction from the camera 4 to the infrared lamp 5. The human eyes 2000 face the infrared lamp 5, and the infrared light emitted from the infrared lamp 5 directly irradiates the human eyes 2000 and then is reflected to the deflection member 6. When being deflected by the deflection member 6, the light is deflected in a direction towards a larger thickness of the deflection member 6, i.e. a portion of the deflection member 6 having a larger thickness than other portions thereof, such that the infrared light vertically irradiates the camera 4. Thus, the camera 4 can capture much infrared light and realize the unlocking.

The electronic device 1000 according to a second aspect of embodiments of the present disclosure includes a camera assembly according to the first aspect of embodiments of the present disclosure. Thus, the iris unlocking can be prevented from being failed and the cost can be reduced.

The electronic device 1000 in the present disclosure may be a mobile terminal such as a mobile phone, a tablet computer, etc. The camera 4 in the present disclosure may also be used in other electronic devices, such as a home security door that requires an iris unlocking function.

Figure 1:
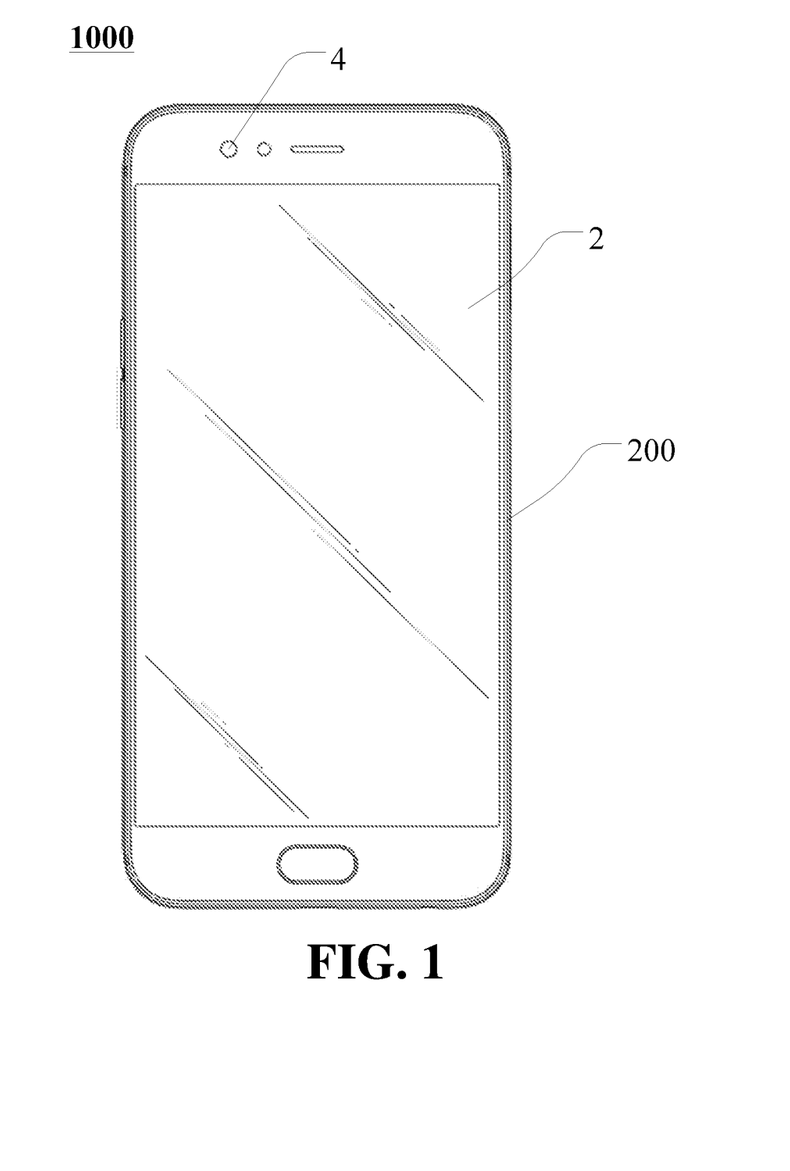
FIG. 1 is a schematic view of an electronic device according to an embodiment of the present disclosure.

As illustrated FIG. 1, when the above electronic device 1000 is the mobile phone, the electronic device 1000 may include: a housing 200, a touch-screen cover plate, a camera 4, a radio-frequency circuit, a memory, an input unit, a wireless fidelity (Wi-Fi) module, a sensor, a display screen 300, an audio circuit, a processor, a fingerprint identification assembly, a battery and other components. The above cover plate 2 is the touch-screen cover plate of the mobile phone, the main board 1 is a circuit main board of the mobile phone, the camera in the mobile phone includes the above camera 4 of the above camera assembly, and the display screen 300 is arranged at an inner side the cover plate 2.

Reference throughout this specification to terms "an embodiment," "some embodiments," "an illustrative embodiment," "an example," "a specific example," or "some examples" means that a particular feature, structure, material, or characteristic described in connection with the embodiment or example is included in at least one embodiment or example of the present application. In this specification, the appearances of the aforesaid terms are not necessarily referring to the same embodiment or example. Moreover, the particular features, structures, materials, or characteristics described may be combined in any suitable manner in one or more embodiments or examples.

Although embodiments of the present disclosure have been illustrated and described above, it should be understood by those skilled in the art that changes, modifications, alternatives, and variations may be made in the embodiments without departing from principles and purposes of the present disclosure. The scope of this disclosure is defined by the claims and their equivalents.

What is claimed is:

1. A camera assembly for an electronic device, comprising:
   a cover plate;
   a main board arranged parallel to the cover plate and spaced apart from the cover plate;
   a camera arranged on a side of the main board facing towards the cover plate;
   an infrared lamp arranged on the side of the main board facing towards the cover plate, the infrared lamp being spaced apart from the camera; and
   a deflection member arranged on a side of the cover plate facing towards the main board and being opposite to the camera, the deflection member being configured to deflect infrared light emitted from the infrared lamp towards a direction of a central axis of the camera,
   wherein in a direction from the camera to the cover plate, the deflection member has a first surface and a second surface opposite to each other, wherein the first surface is adjacent to the camera, wherein the second surface is far away from the camera, wherein the first surface and the second surface define an angle therebetween,
   wherein in a direction from the camera to the infrared lamp, the first surface is inclined towards the camera, and the second surface is arranged parallel to the cover plate,
   wherein the first surface has a curved surface structure, and wherein in the direction from the camera to the infrared lamp, a tangent line of each point on the first surface is inclined towards the camera.

2. The camera assembly according to claim 1, wherein a section of the deflection member has a triangle shape or a trapezoid shape, and the section of the deflection member refers to a plane figure taken from the deflection member along a plane where an optical axis of the infrared lamp and the optical axis of the camera are.

3. The camera assembly according to claim 2, wherein the deflection member has a triangular prism structure.

4. The camera assembly according to claim 1, wherein in a direction from the camera to the infrared lamp, a size of the deflection member is larger than a size of the camera.

5. The camera assembly according to claim 1, wherein the deflection member is connected to the cover plate by an adhesive layer.

6. The camera assembly according to claim 5, wherein the deflection member is fixed to the cover plate by a double-sided adhesive or a dispensed adhesive.

7. The camera assembly according to claim 1, wherein the deflection member is a polymethyl methacrylate member or a polycarbonate member.

8. The camera assembly according to claim 1, wherein the cover plate is a flat touch-screen cover plate.

9. The camera assembly according to claim 1, wherein the cover plate is made of glass materials.

10. The camera assembly according to claim 1, wherein the camera is an iris camera.

11. The camera assembly according to claim 1, wherein a wavelength of the infrared light emitted from the infrared lamp is 940 nm.

12. An electronic device, comprising:
   a housing;
   a cover plate connected to the housing to define an inner space therebetween;
   a main board received in the inner space, arranged parallel to and spaced apart from the cover plate;
   a camera arranged on a side of the main board facing towards the cover plate;
   an infrared lamp arranged on the side of the main board facing towards the cover plate, the infrared lamp being spaced apart from the camera; and
   a deflection member arranged on a side of the cover plate facing towards the main board and being opposite to the camera, wherein the deflection member is configured to deflect infrared light emitted from the infrared lamp towards a direction of a central axis of the camera,
   wherein in a direction from the camera to the cover plate, the deflection member has a first surface and a second surface opposite to each other, wherein the first surface is adjacent to the camera, wherein the second surface is far away from the camera, wherein the first surface and the second surface define an angle therebetween,
   wherein in a direction from the camera to the infrared lamp, the first surface is inclined towards the camera, and the second surface is arranged parallel to the cover plate,
   wherein the first surface has a curved surface structure, and wherein in the direction from the camera to the infrared lamp, a tangent line of each point on the first surface is inclined towards the camera.

13. The electronic device according to claim 12, wherein in a direction from the camera to the cover plate, the deflection member has a first surface and a second surface opposite to each other, the first surface is adjacent to the camera, the second surface is far away from the camera, and the first surface and the second surface define an angle therebetween.

14. A camera assembly for an electronic device, comprising:
   a cover plate;
   a main board arranged parallel to the cover plate and spaced apart from the cover plate;
   a camera arranged to the main board and facing towards the cover plate;
   an infrared lamp arranged to the main board, facing towards the cover plate, and spaced apart from the camera; and
   a deflection member arranged to the cover plate, facing towards the main board and being opposite to the camera, wherein the deflection member is configured to deflect infrared light emitted from the infrared lamp in such a manner that the infrared light emitted from the infrared lamp is propagated in a direction of a central axis of the camera after passing through the deflection member,
   wherein in a direction from the camera to the cover plate, the deflection member has a first surface and a second surface opposite to each other, wherein the first surface is adjacent to the camera, the second surface is far away from the camera, wherein the first surface and the second surface define an angle therebetween,
   wherein in a direction from the camera to the infrared lamp, the first surface is inclined towards the camera, and the second surface is arranged parallel to the cover plate, wherein the first surface has a curved surface structure, and wherein in the direction from the camera to the infrared lamp, a tangent line of each point on the first surface is inclined towards the camera.

* * * * *